Inventor

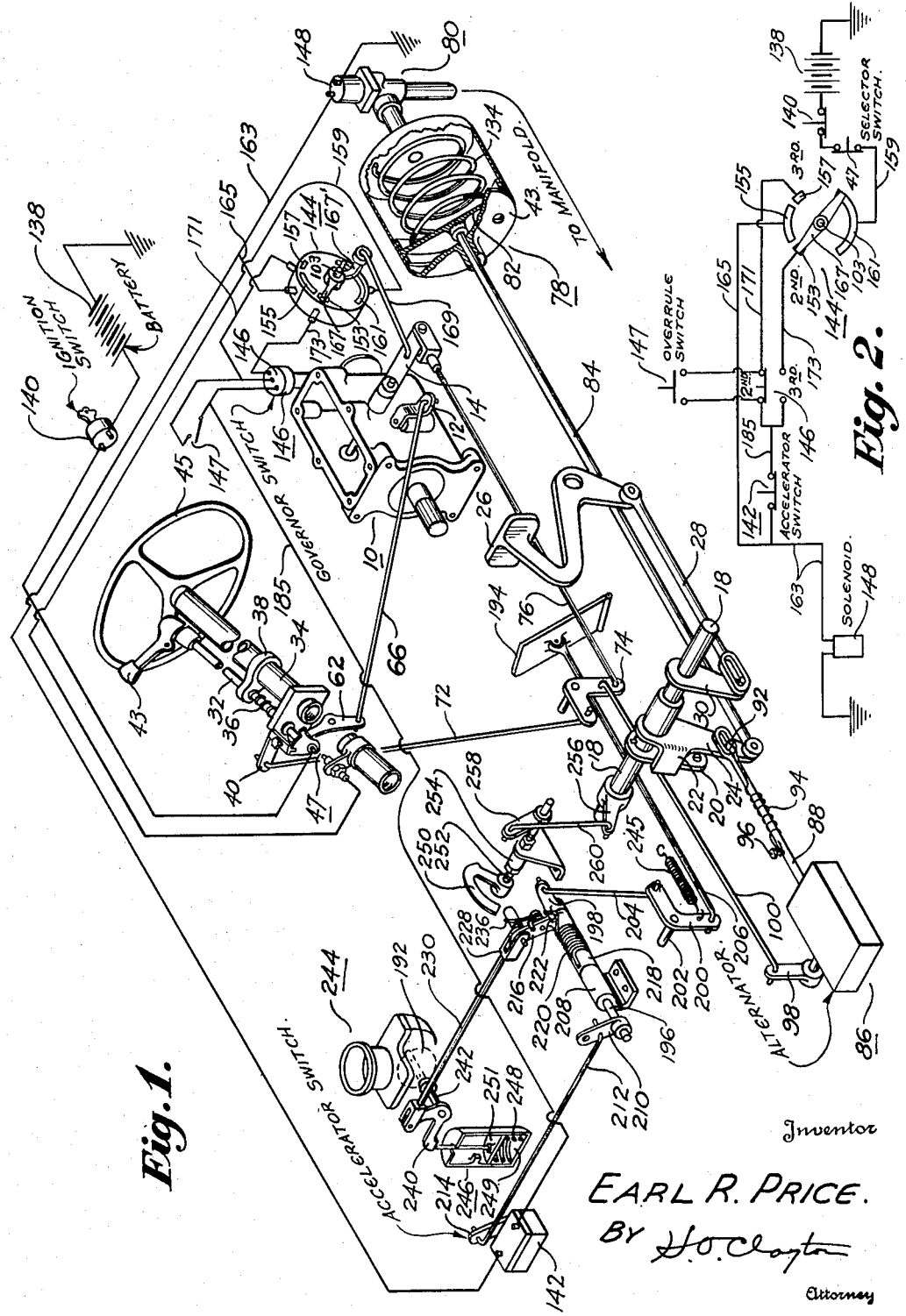

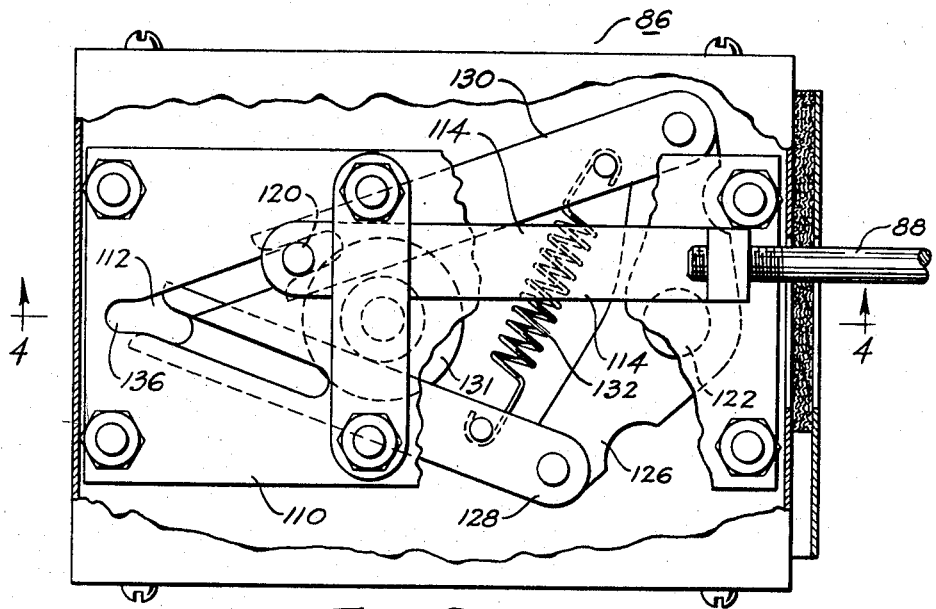
Fig. 3.
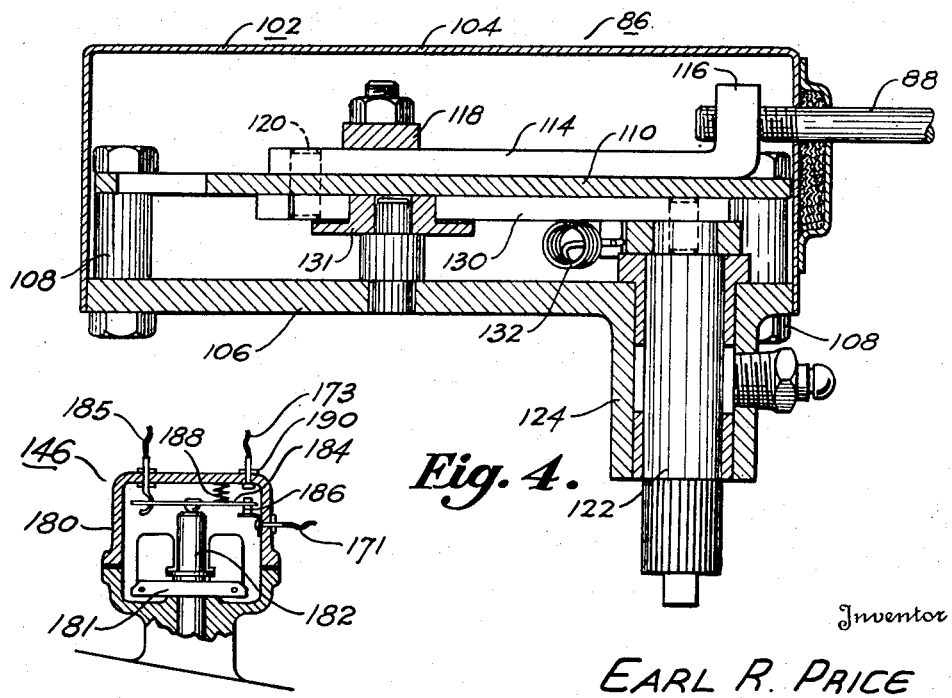
Fig. 4.
Fig. 8.
Inventor
EARL R. PRICE
By H. O. Clayton
Attorney April 22, 1952     E. R. PRICE     2,593,605
TRANSMISSION OPERATING MECHANISM Filed July 11, 1946     4 Sheets-Sheet 3

EARL R. PRICE.

By H. O. Clayton

Attorney

April 22, 1952     E. R. PRICE     2,593,605
TRANSMISSION OPERATING MECHANISM
Filed July 11, 1946     4 Sheets-Sheet 4
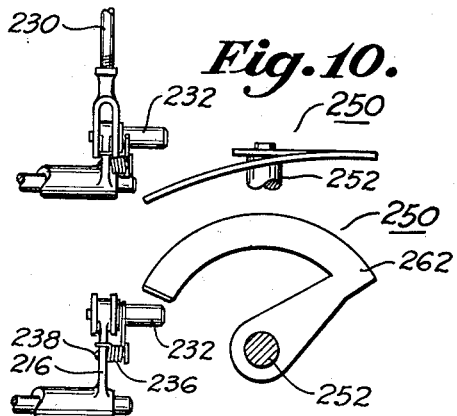
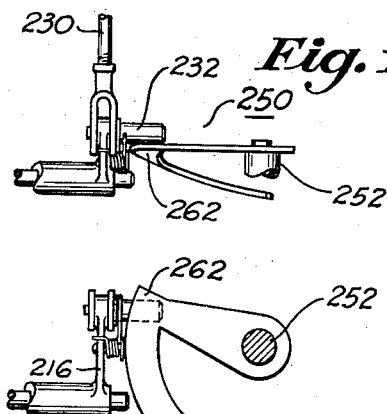
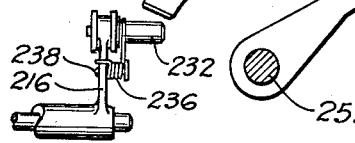
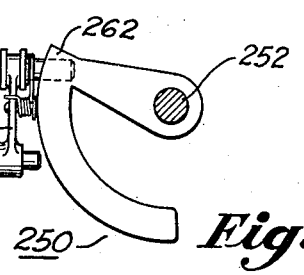
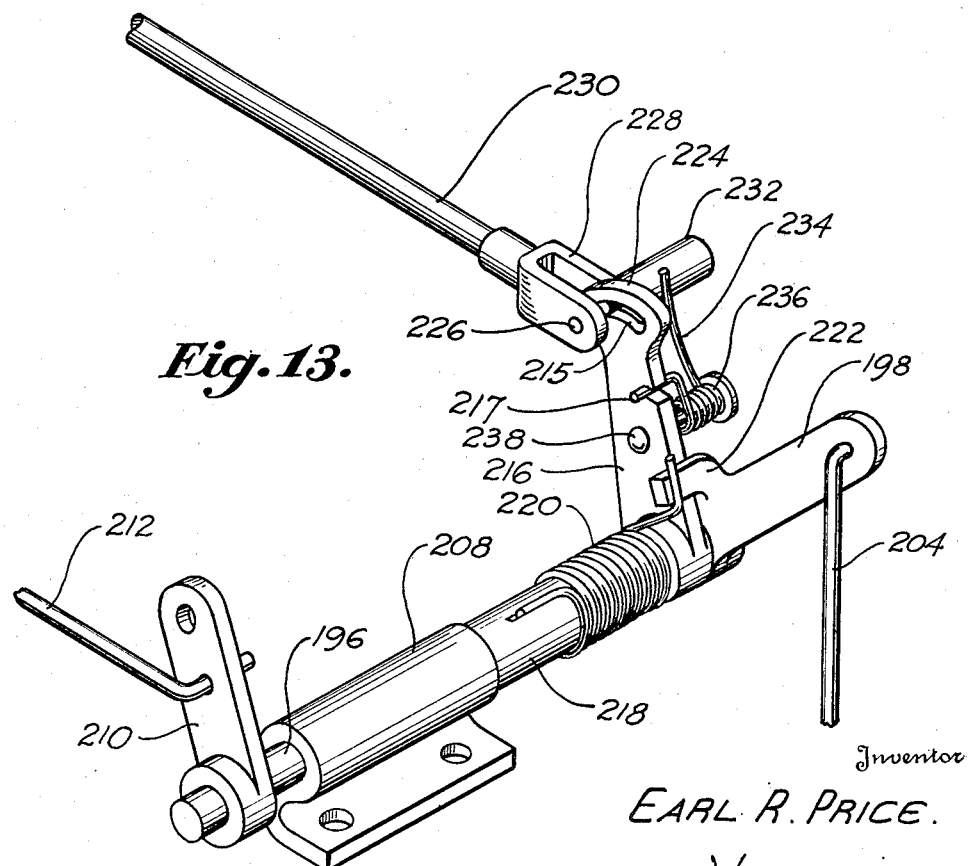
Inventor
EARL R. PRICE.
By H. C. Clayton
Attorney Patented Apr. 22, 1952

2,593,605

UNITED STATES PATENT OFFICE 2,593,605

TRANSMISSION OPERATING MECHANISM

Earl R. Price, South Bend, Ind., assignor to Bendix Aviation Corporation, South Bend, Ind., a corporation of Delaware Application July 11, 1946, Serial No. 682,766

11 Claims. (Cl. 192—.073)

This invention relates in general to the power transmission mechanism of an automotive vehicle and in part to means for operating the change speed transmission and the friction clutch of said mechanism.

One of the objects of my invention is to provide, in an automotive vehicle including a fluid coupling and a three speeds forward and reverse transmission, a simple mechanism, power operated in part, for operating said transmission, all of the settings thereof being effected by a manual operation of said mechanism if the driver desires to so operate the mechanism, and the second and high gear settings of the transmission, and the operation of the friction clutch to facilitate said settings, being effected by power means if the driver elects this operation of the mechanism.

A further object of my invention is to provide, in an automotive vehicle including a fluid coupling, a friction clutch and a three speeds forward and reverse transmission, means for operating and for facilitating the operation of said transmission, said means including power means, comprising a single acting motor, which is automatically operable, after the accelerator is released, to establish the transmission either in its second gear setting or its high gear setting depending upon the speed of the vehicle, the friction clutch being operated by said motor to facilitate this operation of the transmission, said first-mentioned means further including manually operated means for effecting any one of the gear settings of the transmission.

A further object of my invention is to provide a manually and power operated accelerator and governor controlled mechanism for operating a three speeds forward and reverse transmission and a friction clutch, said mechanism being capable of effecting a manual operation of the transmission and also capable, after a selector lever of the mechanism is first operated to establish the transmission in its second gear setting and then positioned in a certain automatic setting, of effecting a power operation of the transmission to alternately effect the second and high gear settings thereof, the friction clutch being disengaged to facilitate each of said operations and reengaged after each operation is completed.

The principle object of my invention, however, is to improve upon the aforementioned transmission and clutch operating mechanism, which incidentally is disclosed in the U. S. application for patent of E. R. Price, No. 642,240, filed January 9, 1946, by providing in said mechanism a transmission operated switch mechanism which will insure the operation of the transmission called for by the governor of said mechanism.

Yet another object of my invention is to provide power means operative to alternately establish a three speeds forward and reverse transmission in its second and high gear settings, said means including a governor operated switch mechanism cooperative with a transmission operated switch mechanism to (1) insure a completion of one or the other of said operations once initiated and (2), by a re-cycle operation of the mechanism, to insure the setting of the transmission called for by the governor operated switch mechanism.

Other objects of the invention and desirable details of construction and combination of parts will become apparent from the following description of a preferred embodiment of my invention, which description is taken in conjunction with the accompanying drawings, in which:

Figure 1 is a diagrammatic view of my invention disclosing the principal features thereof;

Figure 2 is a wiring diagram of the electrical mechanism disclosed in Figure 1;

Figure 3 is a view disclosing details of the alternator unit of Figure 1;

Figure 4 is a sectional view of the alternator unit said view being taken on the line 4—4 of Figure 3;

Figure 8 is a sectional view disclosing details of the governor operated switch of the invention;

Figure 9 is a front view of the principal parts of the clutch operated stop mechanism of my invention, said mechanism serving to control the operation of the throttle;

Figure 10 is a plan view of the mechanism of Figure 9;

Figure 11 is a view similar to Figure 9, disclosing the stop mechanism in position to prevent an opering of the throttle;

Figure 12 is a plan view of the mechanism disclosed in Figure 11; and

Figure 13 is a figure disclosing details of the lost-motion connection incorporated in the linkage interconnecting the accelerator and throttle of the mechanism of Figure 1.

Figure 5:
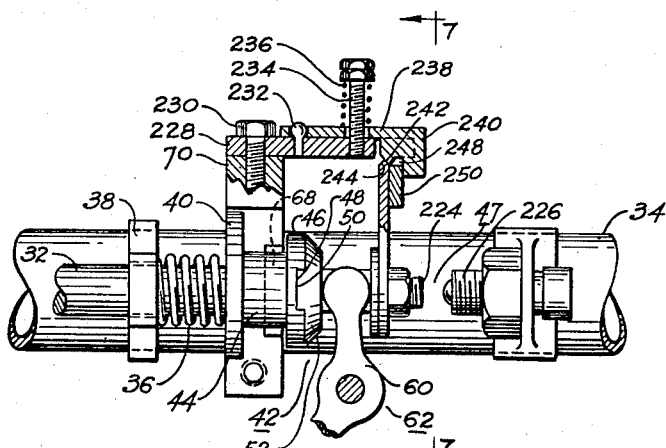
Figure 5 is an enlarged view of the mechanism at the base of the steering column said mechanism serving to disconnect the shift lever from the power operated transmission operating linkage.

Referring now to Figure 1 disclosing a preferred embodiment of my invention, a three-speeds forward and reverse transmission 10, preferably that used in one of the 1942 cars, is operated by means of a manually operated crank 12 and a manually and power operated crank 14, the crank 12 serving to operate the shift rail selecting mechanism of the transmission and the crank 14 serving to operate that part of the transmission functioning to move the selected rail to establish the transmission in the desired gear ratio. With such a transmission the crank 14 must be moved to its transmission neutral position to neutralize the transmission before the shift rail selecting crank 12 may be operated.

My invention has to do with the manually and power operated means for actuating the aforementioned transmission operating cranks 12 and 14; for operating the engine throttle 192, and for operating a conventional friction clutch, not shown, said clutch including the usual driving and driven plates forced into engagement by clutch springs. The aforementioned transmission and the clutch as well as the hereinafter referred to fluid coupling are of conventional design, accordingly, no claim is made thereto and the same are not disclosed in the drawings. The mechanism of my invention preferably includes, in the power plant of the vehicle, a fluid coupling such for example as that which was incorporated in several 1941 and 1942 passenger vehicles and said coupling includes an impeller and a vaned rotor the latter serving to drive the aforementioned driving plate of the clutch.

The friction clutch, not shown, is operably connected to a clutch throw out shaft 18 to which is keyed a crank member 20 contactable by a flange member 22 extending laterally from a crank member 24 rotatably mounted on the shaft 18. The conventional manually operated clutch pedal 26 of the car is operably connected, by a link 28, to a crank 30 which is drivably connected to the shaft 18. As is disclosed in Figure 1 the connection between the crank 30 and link 28 is of the lost-motion type to obviate a movement of the clutch pedal when the clutch is power operated by the mechanism described hereinafter.

Figure 6:
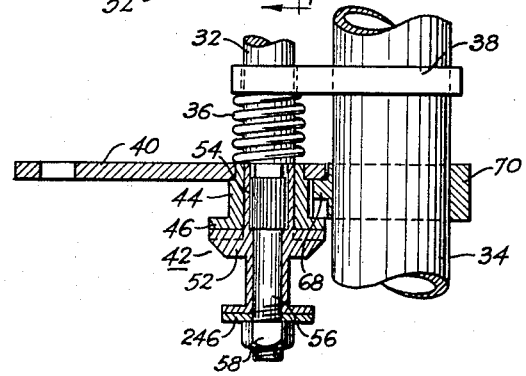
Figure 6 is a sectional view, taken on the line 6—6 of Figure 7, disclosing certain features of the mechanism disclosed in Figure 5.
Figure 7:
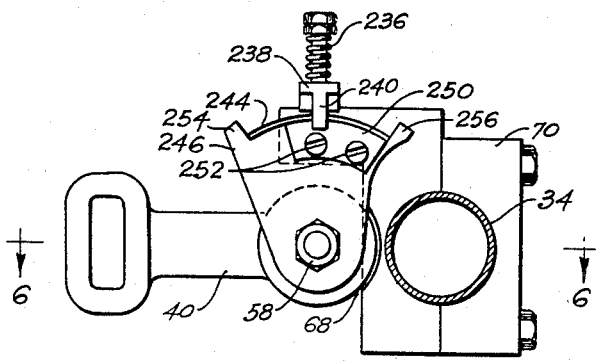
Figure 7 is a front view, taken on the line 7—7 of Figure 5, of the mechanism disclosed in Figure 5.

The shift rail operating cranks 12 and 14 are actuated by force transmitting means including a rotatable and bodily movable shaft 32 extending alongside the steering column 34 of the vehicle. As is disclosed in Figures 1, 5, and 6, the shaft 32 is biased downwardly by a spring 36 positioned between a stop 38 mounted on the steering column and a crank member 40 which is operably connected to said shaft by means of a clutch mechanism 42 described hereinafter. A shift lever 43 mounted beneath the steering wheel 45 is so connected to the shaft 32 that a rotation of said lever in a plane parallel to said wheel effects a rotation of said shaft about its longitudinal axis in the operation of either neutralizing the transmission or establishing the same in a gear setting; and this connection between the shift lever and shaft 32 is also such that the cross-shift movement of the shift lever, that is the movement in a plane perpendicular to the plane of the steering column, results in a movement of the shaft 32 to either effect a shift rail selecting operation of the crank 12 or effect a declutching operation of the clutch 42 and a closing of a selector switch 47 to prepare the mechanism for its power operation.

Describing the aforementioned clutch mechanism 42, the said mechanism includes a member 44 sleeved over the lower end of the shaft 32, said member being permanently secured as by brazing to the crank 40. The lower end portion of the member 44 is provided with a flange 46 which is recessed at 48, Figure 5, to provide a keyway for a key portion 50 of a spool-shaped end portion of a clutch member 52, said member being sleeved over and drivably connected by splines 54 to the end portion 56 of the shaft 32. A nut 58, threaded on the end of the shaft portion 56, serves as a stop for the clutch mechanism which is biased downwardly by the operation of the spring 36.

The upper arm 60 of a bell-crank lever 62 fits within the spool-shaped portion of the clutch member 52 and the lower arm 64 of said lever is pivotally connected, by a link 66, to the shift rail selecting crank 12. As is disclosed in Figure 6, the spring 36 serves to bias the clutch 42 and shaft 32 as a unit downwardly, the movement being limited by a stop 68, Figure 6, constituting a part of a steering column mounted bracket member 70; and in this position of the clutch 42 the shift rail selector crank 12 is actuated to prepare the transmission for either a second gear or high gear operation, said operation of course depending upon the subsequent actuation of the shift rail operating crank 14. To actuate the crank 12 to prepare the transmission for either a low gear or reverse gear operation, that is a selection of the low and reverse gear shift rail of the transmission, the driver lifts the shift lever 43 upwardly in a plane perpendicular to the plane of the steering wheel; and this operation serves to rotate the bell crank lever 62 in a counter-clockwise direction, Figure 5, the spring 36 being compressed and the flange 46, Figure 6, being moved into engagement with the stop 68. To actuate the shift rail operating crank 14 to neutralize the transmission or establish the same in any one of its four gear ratio settings, the driver rotates the shift lever 43 in a plane parallel to the plane of the steering wheel thereby effecting an angular movement of the crank 40 which is preferably connected to the crank 14 by force transmitting means including link 72, a bell crank lever 74 and a link 76.

There is thus provided, by the above described mechanism, means for manually operating a three speeds forward and reverse transmission; and in this manual operation of the transmission the shift lever 43 is movable to five different positions, said selective movement outlining the letter H.

Describing now the power means for controlling the operation of the throttle and operating the transmission and clutch the principal element of this power means consists of a single-acting fluid pressure motor 78 operably connected to the clutch throwout shaft 18 and to the shift rail operating crank 14; and said motor is controlled by a standard type of solenoid operated three way valve 80, no claim to which is made.

Describing now the details of the aforementioned power means, the power element 82 of the motor 78 is connected to the crank 24 by a link 84; and said crank is yieldingly connected to an alternator unit 86 by means, preferably including a pin 92 extending from the crank. One end of a spring 94, preferably coiled around the link 88, is connected to a pin 96 secured to said link; and the other end of said spring is fastened to the pin 92. A crank 98 of the alternator mechanism 86 is pivotally connected to the bell crank lever 74 by a link 100.

Describing now the details of the alternator 86, that is the direction changing mechanism of my invention, the same includes a casing 102, Figure 4, of two parts 104 and 106. To the casing part 106 there is detachably secured by bolts 108 a plate 110 having a V-shaped guide slot 112 therein, and a thrust member 114 adjustably secured at 116 to the link 88 and positioned between a strap 118 and the outer face of the plate 110 is provided with a laterally extending pin 120 which extends through the aforementioned V-shaped slot. To the outer end of a rotatable shaft 122 journalled in a boss 124 extending from the casing part 106 there is drivably connected the aforementioned crank 98, Figure 1; and to the inner end of the shaft 122 there is drivably connected a bell crank lever 126. To one end of the latter lever there is pivotally connected a thrust link 128 which is recessed at its outer end to receive the pin 120; and to the other end of the lever 126 there is pivotally connected another thrust link 130 which is also recessed at its outer end to receive the pin 120; and the two thrust links are biased towards each other into contact with a guide roller 131 by a spring 132 connected to both of said links.

Describing the operation of the above described alternator 86, when the fluid pressure motor 78 is de-energized a return spring 134 therein together with the clutch springs, serve to move the link 88 and thrust member 114 connected thereto to the left, Figure 3, to position the pin 120 within a recess 136 constituting the apex of the aforementioned V-shaped guide slot 112; then when the motor 78 is energized to effect an operation of the transmission and clutch, the pin 120, after moving a relatively short distance, rests within the recessed end of one or the other of the thrust links 128 and 130, depending upon whether the transmission is at the time established in second gear or in high gear. Continued movement of the thrust member 114 then results in a rotation of the lever 126 to rotate the crank 98 to establish the transmission in its new setting; and as will be noted from an inspection of Figure 3 this operation of the lever 98 serves to move the then inoperative thrust link into position preparatory for its operation to rotate the lever 126.

There is thus provided an alternator or direction changing means whereby the transmission operating angular movement of the crank 14 is alternately reversed with each successive energization of the single-acting motor 78.

Describing now the means for controlling the operation of the engine throttle 192, said control means is disclosed in Figure 1 and Figures 12 to 13 inclusive of the drawings and is disclosed and claimed in the U. S. patent application of Richard H. Long No. 668,971, filed May 10, 1946. The accelerator 194 of the vehicle is operatively connected to a shaft 196 by means of a crank 198 secured to said shaft, a bell crank lever 200 pivotally mounted on a pin 202, a rod 204 interconnecting the lever 200 and crank 198, and a rod 206 interconnecting the accelerator and the lever 200. The shaft 196 is journalled in a bearing 208 and to one end of said shaft there is secured a crank 210 which is connected, by a rod 212, to a crank 214 serving to operate the accelerated operated breaker switch 142. A crank member 216 is secured to one end of a sleeve member 218 which is rotatably mounted on the shaft 196; and the cranks 198 and 216 are yieldingly interconnected by means of a coil spring 220 sleeved over the sleeve member 218, one end of the spring 220 being secured to the body of the sleeve member 218 and the other end of said spring being biased into engagement with a boss 222 projecting laterally from one side of the crank 198. The spring 220 therefore when released serves to bias the cranks 198 and 216 to the relative positions disclosed in Figures 1 and 13.

The crank 216 is provided with a slot 215 in an end portion 224, Figure 13, and through said slot there extends a pin 226 mounted in the U-shaped, that is bifurcated end 228 of a rod 230. To one end of the pin 226 there is secured a pin 232 and one end 234 of a coil spring 236 serves to bias said pin to the left, Figure 13, toward the left end portion of the slot in the crank 216. The spring 236 is mounted on a pin 238 mounted in and extending laterally from the crank 216 one end 217 of said spring being fitted within an opening in said crank. The rod 230 is pivotally connected to a bell crank lever 240 the hub of said lever being fixedly secured to a shaft 242 serving to operate the aforementioned throttle valve 192 of the carburetor 244 of the vehicle. Upon release of the accelerator a return spring 245 secured to the lever 200 is operative to successively close the switch 142 and the throttle the latter operation being cushioned by the operation of a dashpot 246. Describing these operations the spring 245, as it contracts, serves first to close the switch 142 the cranks 198, 210 and 216 rotating counter-clockwise, Figure 13. The spring 245, which is stronger than the spring 236, then serves, by virtue of the operation of the dashpot, to close the throttle at a relatively slow rate; for as the spring 248 is compressed, air from a compartment 249 of the dashpot escapes past a piston 251 thereof. Explaining this operation it is to be noted that (1) the spring 236 is stronger than the dashpot spring 248 and (2) the switch operating crank 214 may be moved counter-clockwise after the switch 142 is closed. Lastly the spring 245 serves to continue the counter-clockwise rotation of the cranks 198 and 216 after the throttle is completely closed and the spring 248 has gone solid; and this operation results in a further compression of the spring 236 the crank 216 being rotated counter-clockwise until the pin 226 is positioned in the extreme right end of the slot 215 in the crank 216.

A clutch operated cam-like stop member 250, disclosed in detail in Figures 9 to 12 inclusive, serves to determine the operative position of the aforementioned pin 232 the face of said stop being curved as disclosed in said figures. This stop 250, which is preferably a segment of a disk or washer, is non-rotatably secured to a shaft 252 journalled in a bearing 254 and said shaft is operably connected to the friction clutch, not shown, by a crank 256 non-rotatably secured to the clutch operating shaft 18, a crank 258 non-rotatably secured to the shaft 252 and a rod 260 interconnecting said cranks.

Describing the operation of the stop 250 the first increment of movement of the motor piston 82, in the operation of disengaging the clutch and operating the transmission, serves to rotate said stop counter-clockwise to the position disclosed in Figures 11 and 12; and in this position the pin 232 abuts a heel portion 262 of said stop thereby preventing an opening of the throttle 192. If the accelerator is depressed during this operation of the motor piston 82 then this operation of the accelerator serves to increase the tension of the coil spring 220 the crank 198 moving away from the crank 216, which, of course, remains stationary. The crank 216 is by this operation subjected to a load imparted by the spring 220.

Describing now the operation of the stop 250 as the clutch is being engaged, that is, when the piston 82 starts its leftward movement by the expanding operation of spring 134, there results a clockwise rotation of said stop, Figure 9, this operation being effected by the springs of the friction clutch as they expand to effect an engagement of the clutch. The engagement of the clutch may therefore be said to be controlled by the operation of the motor 78. Now as the stop 250 rotates to the right as the clutch is being engaged the pin 232 is pressed against the curved, that is, cam face of said stop; and the parts of the mechanism of my invention are so constructed and arranged and so operative that the opening of the throttle is effected immediately after the clutch plates first contact with each other the pin 232 being at this time positioned at about the mid-point of the face of the stop. Thereafter the curve of the face of the stop is such that the throttle is progressively opened as the clutch plating loading is progressively increased; and this is the operation desired for it simulates a driver's manually controlled engagement of a friction clutch as he depresses the accelerator to speed up the engine.

As to the means for controlling the operation of motor 78, said means includes the electrical mechanism disclosed in Figures 1 and 2; and this mechanism comprises a grounded battery 138, the ignition switch 140 of the car, the aforementioned shift lever operated or selector switch 47, an accelerator operated breaker switch 142 which is closed when the accelerator is released, a switch mechanism 144 operated by the motor 78, a vehicle speed responsive governor operated single pole double throw switch mechanism 146, a manually operated over-rule switch 147 and a grounded solenoid 148 which operates the motor controlling three way valve 80. The aforementioned switch mechanisms are electrically interconnected as disclosed in Figure 2, and of said mechanisms the accelerator operated switch 142 and the over-rule switch 147 are of a conventional breaker switch construction accordingly, the same are not disclosed in detail.

Describing the governor operated switch mechanism 146, disclosed in detail in Figure 8, this mechanism includes a two part casing 180 housing a centrifugally operated governor mechanism 181 which is drivably connected to the propeller shaft of the vehicle or some other moving part of the power plant, the speed of which is directly proportional to the speed of the vehicle. A thrust member 182 of the centrifugal mechanism contacts the central portion of a movable switch contact member 184 which is biased into engagement with a fixed contact 186 by a spring 188. The parts of this switch mechanism are so constructed and arranged and so operative that when the vehicle is at a standstill or is travelling at or below a relatively low speed, for example 10 M. P. H., then the spring 188 serves to move the movable contact member 184 into engagement with the fixed contact 186; and when the vehicle is travelling above governor speed, that is the aforementioned 10 M. P. H., then the centrifugally operated mechanism 181 is operative to force the contact 184 into engagement with a fixed contact member 190. Referring to Figure 2 the switch 184, 186 of Figure 8 is indicated by an abbreviation of the word second and the switch 184, 190 of Figure 8 is indicated by an abbreviation of the word third the words second and third referring of course to the second and third gear settings of the transmission. Completing the description of the switch mechanism 146 the other end of the movable contact member 184 is electrically connected to a wire 185 which is connected to the accelerator-operated switch 142.

Describing now the essence of my invention, that is the motor operated switch 144 and its electrical connection with the remainder of the control mechanism, said switch comprises a casing having secured thereto fixed contacts 153, 155, 157 and 161 connected respectively, by wires 173, 165, 171 and 159, to the fixed contact 190 of the governor switch 146, to a wire 163 which interconnects the solenoid 148 and the accelerator operated switch 142, to the fixed contact 186 of the switch 146 and to the selector switch 47. Completing the description of the motor operated switch 144 there is provided a movable contact member 167, Figure 2, which is actuated by a crank 167'. As is disclosed in Figure 1, the crank 167' is secured to the central portion of the contact member 167, both the crank and contact member being pivotally mounted upon a pin 193 extending from the switch casing.

Referring to Figure 2 will be noted that the overrule switch 147 is electrically connected in parallel with the second speed switch 186, 190 in the electrical circuit interconnecting the accelerator operated switch 142 and the third speed contact 157 of the motor operated switch 144. This overrule switch 147 is preferably mounted in the instrument panel of the driver's compartment and provides means for manually selecting a second gear operation of the motor 78 when the transmission is established in its third gear setting. There is thus provided means, operable at the will of the driver, for overruling the operation of the governor switch 146; for with the inclusion of the switch 147 the driver may operate the mechanism of my invention to establish the transmission in second gear when the vehicle is travelling above governor speed that is the speed at which the mechanism would normally be automatically operable to establish the transmission in second gear. For example, with this mechanism the driver may, with the vehicle travelling at a relatively high speed, shift the transmisson to second gear to pass a car on the road.

Now as will be noted from an inspection of Figure 2 of the drawings the parts of the switch 144 are so operative and so cooperate with the parts of the governor operated switch 146 that an electrical circuit from the selector lever operated switch 47 to the solenoid 148 is completed when the transmission is established in either second gear or high gear and the governor is operated to close one or the other of the two switches 184, 199 and 184, 186 operated thereby; for the movable contact 167 leaves the contact 155 and moves into contact with the second gear contact 153 just as the second gear setting of the transmission is being completed; and said movable contact 167 leaves the contact 155 and moves into contact with the contact 157 just as the third gear setting of the transmission is completed. Now as is disclosed in Figure 2 the contacts 153 and 190 are wired together as are the switch contacts 157 and 186; accordingly it follows that in the completion of either the second gear setting or the high gear setting of the transmission the switch mechanism is prepared for a subsequent operation of the transmission said operation to be initiated when the governor is again operative to effect another operation of the switch 146 and when the accelerator is again released to close the switch 142. It is also apparent from an inspection of Figures 1 and 2 that by the inclusion of the contact 155 which is wired directly to the solenoid 148 there is provided electrical means for insuring a completion of a cycle of operations of the motor 78 once said cycle is initiated; for during the clutch disengaging and transmission operating operation of said motor should the driver, by applying the brakes of the car, slow the vehicle down below governor speed before the aforementioned operation of the motor is completed then in the absence of the contact 155 and its electrical connection with the solenoid 148 the movement of the piston 82 would be automatically arrested. However, with the switch mechanism of my invention the operation of the transmission once initiated is completed and if during said operation the car speed is changed thereby calling for the other of the two high speed settings of the transmission then the motor is again operated to effect what may be termed a re-cycle operation to establish the setting of the transmission called for by the governor.

Describing the operation of the switch mechanism 144 to effect the latter operations, when the governor operated switch 146 initiates an operation of the mechanism of my invention the first increment of movement of movable contact 167 results in a bridging of the contact 155 and one or the other of the contacts 153 or 157 thereby insuring an uninterrupted flow of electricity through the solenoid 148; then when the movable contact 167 leaves the contact 155 and moves on to either the contact 153 or 157, the solenoid 148 is automatically de-energized thereby de-energizing the motor 78; and the switch mechanism 144 is, by this operation, prepared for a subsequent operation of the mechanism of my invention.

There is thus provided a relatively simple manually and power operated means for operating the three speeds forward and reverse transmission of an automotive vehicle the friction clutch of the vehicle also being operated by said means to facilitate the operation of the transmission. With the mechanism of my invention the transmission may be completely manually operated; or if the driver desires an automatic operation of the transmission he merely has to place the shift lever in a certain position whereupon the motor 78 takes over the operation to shuttle the transmission back and forth to its second and high gear settings the clutch being also operated to facilitate these operations; and the fluid coupling in the power plant also facilitates said operations.

I claim:

1. In an automotive vehicle provided with a three speeds forward and reverse transmission, an accelerator and a friction clutch; means for operating the transmission and clutch including a pressure differential operated motor cooperating with other means to alternately effect the second and high gear settings of the transmission and operate the clutch to facilitate said operations of the transmission, valve means for controlling the operation of said motor, and electrical means for controlling the operation of said valve means including a solenoid for actuating the valve means, and means for controlling the operation of said solenoid comprising an accelerator operated switch, a personally operated selector switch, a single pole double throw governor operated switch including two fixed contacts, and a switch mechanism actuated by the motor, said motor operated switch mechanism being so constructed and so wired to the personally operated selector switch, the accelerator operated switch, the solenoid and the two fixed contacts of the governor operated switch mechanism that once an electrical circuit is completed to energize the solenoid said energization is maintained, by the completion of another electric circuit, until the transmission is established in gear whereupon said latter circuit is broken.

2. In an automotive vehicle provided with a three speeds forward and reverse transmission, an accelerator and a friction clutch; means for operating the transmission and clutch including a pressure differential operated motor cooperating with other means to alternately effect the second and high gear settings of the transmission and operate the clutch to facilitate said operations of the transmission, valve means for controlling the operation of said motor, and electrical means for controlling the operation of said valve means including a solenoid for actuating the valve means, and means for controlling the operation of said solenoid comprising an accelerator operated switch, a manually operated selector switch, a single pole double throw governor operated switch including two fixed contacts, and a switch mechanism actuated by the motor, said motor operated switch mechanism including four fixed contacts and a movable contact, said movable contact serving, with one operation of the electrical mechanism, to successively interconnect a certain one of said four fixed contacts with two of said fixed contacts, then interconnect said certain fixed contact with one of said fixed contacts, then interconnect said certain fixed contact with another one of said fixed contacts, then, with another operation of the electrical mechanism, interconnect said certain fixed contact with two of said fixed contacts, then interconnect said certain fixed contact with one of said fixed contacts, and then interconnect said certain fixed contact with one of said fixed contacts; and four separate electrical conductors secured to said four fixed contacts and connected respectively, to the selector switch, to one of the two fixed contacts of the governor operated switch, to the other of the two fixed contacts of the governor operated switch, and to the solenoid.

3. In an automotive vehicle provided with a three speeds forward and reverse transmission, a gear shift lever, an accelerator and a friction clutch; manually and power operated means for operating the transmission and clutch said means including power means for alternately establishing the transmission in its second gear setting and its high gear setting and for operating the clutch to facilitate said operations of the transmission, said power means comprising a pressure differential operating motor operably connected to the transmission and clutch, valve means for controlling the operation of said motor and electrical means for controlling the operation of said valve means said electrical means including a solenoid for actuating the valve means and means for controlling the operation of said solenoid including an accelerator operated switch, a vehicle speed responsive governor, a switch mechanism operated by said governor, a switch mechanism operated by the motor, a switch mechanism operated by the gear shift lever; and a grounded battery all of said four switch mechanisms being so constructed and so electrically interconnected with each other that with a closure of the accelerator operated switch, the motor operated switch mechanism, the gear shift lever operated switch and the governor operated switch, there results an energization of the solenoid to initiate an operation of the transmission and clutch operating motor, the construction and electrical interconnection of the accelerator operated switch, the gear shift lever operated switch and the governor and motor operated switches being such that once the electrical circuit is closed to effect said energization of the solenoid said circuit remains closed until the transmission is established in gear and despite an opening of the accelerator operated switch during said operation.

4. In an automotive vehicle provided with a three speeds forward and reverse transmission, an accelerator and a gear shift lever; manually and power operated means for operating said transmission including a pressure differential operated motor, a crank extending from the transmission casing, said crank, when actuated subsequent to a cross-shift setting of the transmission, serving to establish the transmission either in its second gear setting or its high gear setting; means interconnecting the crank with the power element of the motor and operative, by an operation of the motor, to alternate the direction of angular movement of said crank to thereby effect the aforementioned successive second and high gear operations of the transmission, valve means for controlling the operation of said motor, a solenoid for actuating said valve means, and means for controlling the operation of said solenoid including a vehicle speed responsive governor, a switch mechanism operated by said governor, an accelerator operated switch, a gear shift lever operated selector switch, and a switch mechanism connected with the crank and operated by the motor, said switch mechanism cooperating with the aforementioned switch mechanisms to effect an energization of the solenoid to thereby effect an operation of the motor; the parts of the motor operated switch mechanism being so constructed and arranged and so electrically connected with the governor operated switch mechanism, the accelerator operated switch, the gear shift lever operated switch, and the solenoid that the latter once energized, remains energized until the transmission is established in gear whereupon the solenoid is de-energized to effect a de-energization of the motor and thereby prepare the mechanism for another cycle of operations.

5. Power and manualy operated means for operating the three speeds forward and reverse transmission of an automotive vehicle said means comprising a throttle operating member, a vehicle speed responsive governor, a gear shift lever and a crank operably connected to the transmission and movable to one or the other of two positions to establish the transmission in certain settings, a pressure differential operated motor comprising a cylinder and a power element, force transmitting means, including a direction reversing means, interconnecting said power element and crank, a spring within the cylinder operable, when the motor is de-energized, to operate the force transmitting means to prepare said means for a subsequent transmission operating actuation of the crank, valve means for controlling the operation of said motor, means for actuating said valve means including a solenoid, and electrical means for controlling the operation of said solenoid including a switch operated by the throttle operating member, a selector switch operated by the gear shift lever, a switch mechanism operated by the governor and a switch mechanism operated by the motor, said switches being so constructed and so electrically interconnected that with a closure of the switch operated by the throttle operating member, a closure of the motor operated switch mechanism, a closure of the gear shift lever operated switch, and a closure of the governor operated switch, the solenoid is energized and remains energized until the motor has completed its operation of establishing the transmission in gear and despite an opening of the first mentioned switch during said operation, the motor operated switch mechanism serving, as the latter operation is being completed, to preselect an electrical circuit to prepare the electrical means for a subsequent operation of the solenoid, said preselecting operation also serving to break the electrical circuit then serving to maintain the solenoid energized.

6. In an automotive vehicle provided with a change speed transmission, an accelerator and a manually operated control member; means for operating said transmission including a pressure differential operated motor, valve means for controlling the operation of said motor, and means for controlling the operation of said valve means including a solenoid for actuating the valve means, and means for controlling the operation of said solenoid comprising a manually operated switch actuated by the manually operated member, a switch operated by the accelerator, a vehicle speed responsive governor, a switch mechanism operated by said governor, and a motor operated switch mechanism electrically connected to the manually operated switch, the accelerator operated switch, the governor operated switch mechanism, and the solenoid, said motor operated switch mechanism serving, by virtue of a certain electrical connection with the solenoid, to electrically shunt the governor operated switch and the accelerator operated switch immediately after the operation of the motor is initiated.

7. In an automotive vehicle provided with a change speed transmission, an accelerator, an engine controlling throttle, and a manually operated control member; means for operating said transmission and for controlling the operation of the throttle during said operation including a pressure differential operated motor, force transmitting means interconnecting the motor and transmission, and throttle controlling stop means connected with said force transmitting means, valve means for controlling the operation of said motor, and means for controlling the operation of said valve means including a solenoid for actuating the valve means, and means for controlling the operation of said solenoid comprising a manually operated switch actuated by the manually operated member, a switch operated by the accelerator, a vehicle speed responsive governor, a switch mechanism operated by said governor, and a motor operated switch mechanism electrically connected to the manually operated switch, the governor operated switch mechanism, the accelerator operated switch, and the solenoid, said motor operated switch mechanism serving, by virtue of a certain electrical connection with the solenoid, to electrically shunt the governor operated switch and the accelerator operated switch immediately after the operation of the motor is initiated.

8. In an automotive vehicle provided with an accelerator, a change speed transmission and a friction clutch; means for operating said transmission to alternately establish the same in one or the other of two settings and for operating the clutch to facilitate the operation of said transmission, said means including a pressure differential operated motor operably connected to the clutch and transmission, valve means for controlling the operation of said motor, and electrical means for controlling the operation of said valve means including a solenoid, and means for controlling the operation of the solenoid comprising an accelerator operated switch, a single pole double throw governor operated switch mechanism, and a motor operated selector switch mechanism connected in series with each other, the two fixed contacts of the governor operated switch being wired to fixed contacts of the selector switch mechanism and the movable contact of the governor operated switch being wired to the accelerator operated switch; together with electrical means directly interconnecting the solenoid and a fixed contact of the selector switch, said electrical means providing means for shunting the accelerator switch and governor operated switch to insure a maintenance of the energization of the solenoid until the transmission operating operation of the motor is completed and despite an opening of the accelerator operated switch during said operation.

9. In an automotive vehicle provided with an accelerator, a change speed transmission, an engine controlling throttle, and a friction clutch; means for operating said transmission to alternately establish the same in one or the other of two settings and for operating the clutch and controlling the operation of the throttle to facilitate the operation of the transmission, said means including a pressure differential operated motor operably connected to the clutch, throttle, and transmission, valve means for controlling the operation of said motor, and electrical means for controlling the operation of said valve means including a solenoid, and means for controlling the operation of the solenoid comprising an accelerator operated switch, a single pole double throw governor operated switch and a motor operated selector switch connected in series with each other, the two fixed contacts of the governor operated switch being wired to fixed contacts of the selector switch and the movable contact of the governor operated switch being wired to the accelerator operated switch; together with electrical means directly interconnecting the solenoid and a fixed contact of the selector switch, said electrical means providing means for shunting the accelerator switch and governor operated switch to insure maintenance of the energization of the solenoid until the transmission operating operation of the motor is completed and despite an opening of the accelerator operated switch during said operation.

10. In an automotive vehicle provided with an accelerator, a selective gear transmission, and a friction clutch; means for operating said transmission to alternately establish the same in one or the other of two settings and for operating the clutch to facilitate the operation of the transmission, said means including a pressure differential operated motor operably connected to the clutch and transmission, valve means for controlling the operation of said motor, and electrical means for controlling the operation of said valve means including a grounded solenoid, an accelerator operated switch wired to the solenoid, a governor operated single pole double throw switch having its movable contact wired to the latter switch, a motor operated switch including four fixed contacts and a movable contact operable to selectively interconnect one of said fixed contacts with any one of the three remaining fixed contacts, said motor operated switch being wired both to the governor operated switch and to the solenoid; together with a manually operated switch so electrically connected to the motor operated switch and solenoid as to provide electrical means, operable at the will of the driver, for overruling the governor operated switch.

11. In an automotive vehicle provided with a change speed transmission and an accelerator; means for operating the transmission including a direction changing mechanism and a pressure differential operated motor cooperating therewith to alternately effect two of the settings of the transmission, valve means for controlling the operation of said motor, and electrical means for controlling the operation of said valve means including a solenoid, and means for controlling the operation of said solenoid comprising an accelerator operated switch, a manually operated selector switch, a single pole double throw governor operated switch including two fixed contacts, and a switch mechanism actuated by the motor, said motor operated switch mechanism being so constructed and so wired to the manually operated selector switch, the accelerator operated switch, the solenoid and the two fixed contacts of the governor operated switch mechanism that once an electrical circuit is completed to energize the solenoid said energization is maintained, by the completion of another electrical circuit, until the transmission is established in gear whereupon said latter circuit is broken; together with another manually operated switch so electrically connected to the motor operated switch and solenoid as to provide electrical means, operable at the will of the driver, for overruling the governor operated switch.

EARL R. PRICE.

REFERENCES CITED

The following references are of record in the file of this patent:

UNITED STATES PATENTS

| Number | Name | Date |
|---|---|---|
| 2,109,443 | Hill et al. | Feb. 22, 1938 |
| 2,187,824 | Britton | Jan. 23, 1940 |
| 2,212,282 | Van Buskirk | Aug. 20, 1940 |
| 2,287,272 | Price et al. | June 23, 1942 |
| 2,296,290 | Mayrath | Sept. 22, 1942 |
| 2,348,435 | Hey et al. | May 9, 1944 |